Figure 1:
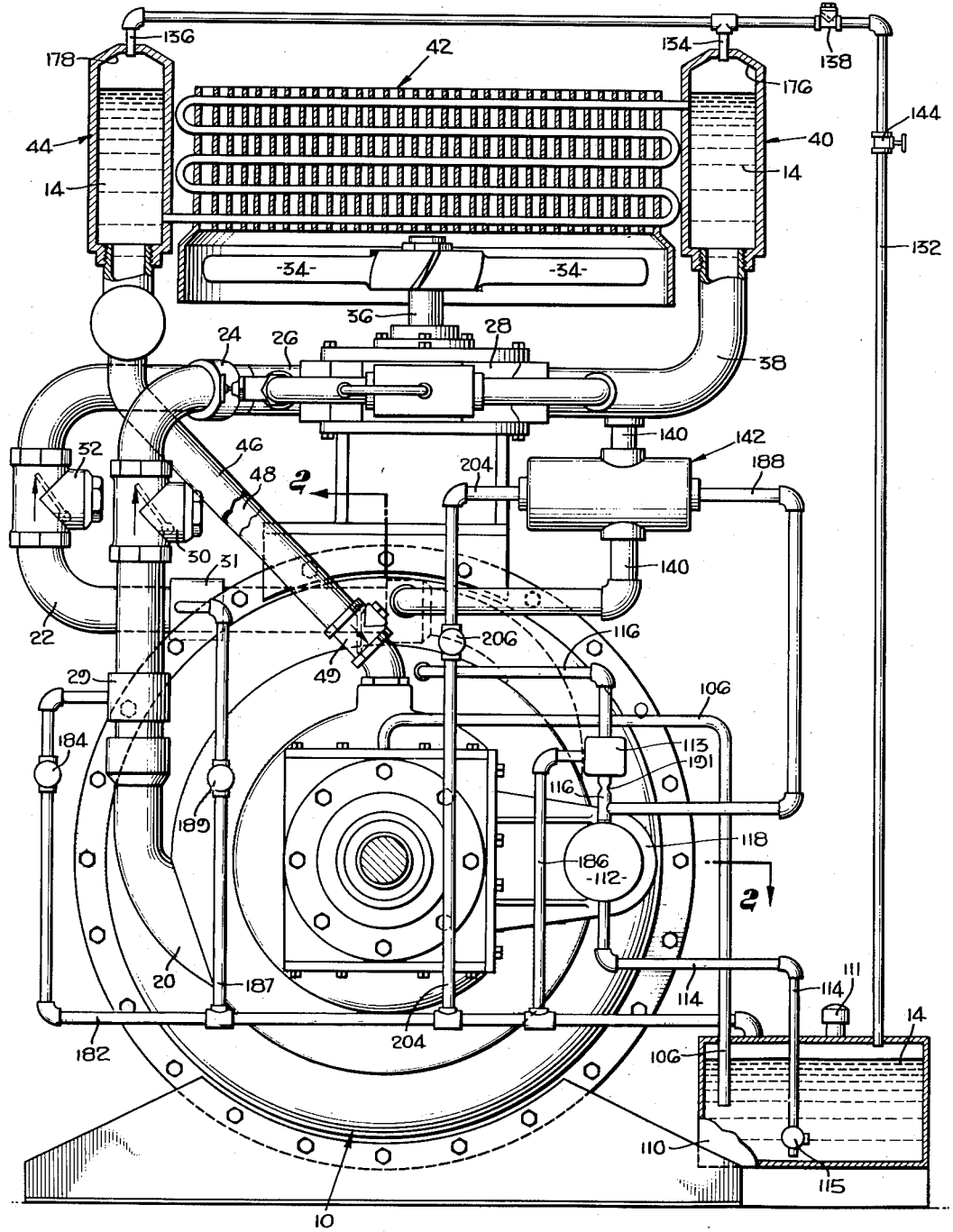

Nov. 15, 1955     C. M. O'LEARY     2,723,530
TORUS CHAMBER TYPE TORQUE CONVERTER FLUID CONTROL SYSTEM
Filed March 19, 1952     3 Sheets-Sheet 1

INVENTOR,
CHARLES M. O'LEARY
BY
ATTORNEY

Nov. 15, 1955 C. M. O'LEARY 2,723,530
TORUS CHAMBER TYPE TORQUE CONVERTER FLUID CONTROL SYSTEM
Filed March 19, 1952 3 Sheets-Sheet 3

CHARLES M. O'LEARY,
INVENTOR.
BY
ATTORNEY

United States Patent Office 2,723,530
Patented Nov. 15, 1955

2,723,530

TORUS CHAMBER TYPE TORQUE CONVERTER FLUID CONTROL SYSTEM

Charles M. O'Leary, Los Angeles, Calif.

Application March 19, 1952, Serial No. 277,457

20 Claims. (Cl. 60—54)

The present invention relates to hydrokinetic torque converters, and more particularly to a unique hydrokinetic torque converter liquid circulatory system.

A problem which is present in the field of hydrokinetic torque converters is that a certain amount of air collects in the upper portion of the torus of the usual converter after the converter has been shunt down, so that if the torus is not purged of air prior to the time the converter is again started up, this air will become broken up into small globules and spread throughout the converter operating liquid, thereby reducing the density of the liquid and reducing the capacity of the converter to transmit torque. This air may be drawn into the torus of the converter as a result of shrinkage of volume of the operating liquid when the converter cools after being shut down. Air may also seep into the converter torus to displace liquid which has leaked out of the torus after operation has ceased.

Accordingly, it is an object of my invention to provide a liquid circulatory system for a hydrokinetic torque converter which will maintain the converter liquid at its maximum density at all times, and which will prevent air from collecting in the torus of the converter after the converter is shut down.

It is another object of my invention to provide a hydrokinetic torque converter liquid circulatory system which will maintain the operating liquid level of the entire converter system above the highest point within the torus of the converter after operation has ceased.

Another object of my invention is to provide a liquid circulatory system for a hydrokinetic torque converter which will insure that the converter operating liquid in the torus of the converter will come up to the operating pressure before the liquid in any other part of the converter operating liquid system.

Another object of my invention is to provide a hydrokinetic torque converter operating liquid circulatory system which will prevent any leakage of liquid from the torus of the converter when the converter is not in operation.

Another object of my invention is to provide a hydrokinetic torque converter operating liquid circulatory system which will compensate for any shrinkage of the operating liquid within the converter torus brought about by a reduction of the temperature of the converter operating liquid after the converter has been shut down.

Another object of my invention is to minimize hydrokinetic torque converter operating liquid leakage during operation of the converter.

Another object of my invention is to provide converter operating liquid seals between the interior of the torus of a hydrokinetic torque converter and the input and output shafts, respectively, of the converter.

Another object of my invention is to maintain the oil seals on the input and output shafts of a hydrokinetic torque converter completely submerged in the converter operating liquid at all times, even when the converter has been shut down.

Another object of my invention is to lubricate all of the input and output shaft bearings of a hydrokinetic torque converter with the same oil that is used to drive the converter turbine element, and to provide means for exchanging this lubricating oil to prevent excessive oil temperatures on the outboard bearings and stationary oil seals of the input and output shafts.

A further object of my invention is to provide apparatus for purging a converter torus of air.

Another object of my invention is to provide a liquid circulatory system for a hydrokinetic torque converter which will insure that the converter operating liquid in the torus of the converter will come up to the operating pressure before the liquid in any other part of the converter operating liquid system.

Other objects and advantages of my invention will become apparent from the following specification and the appended claims.

Figure 2:
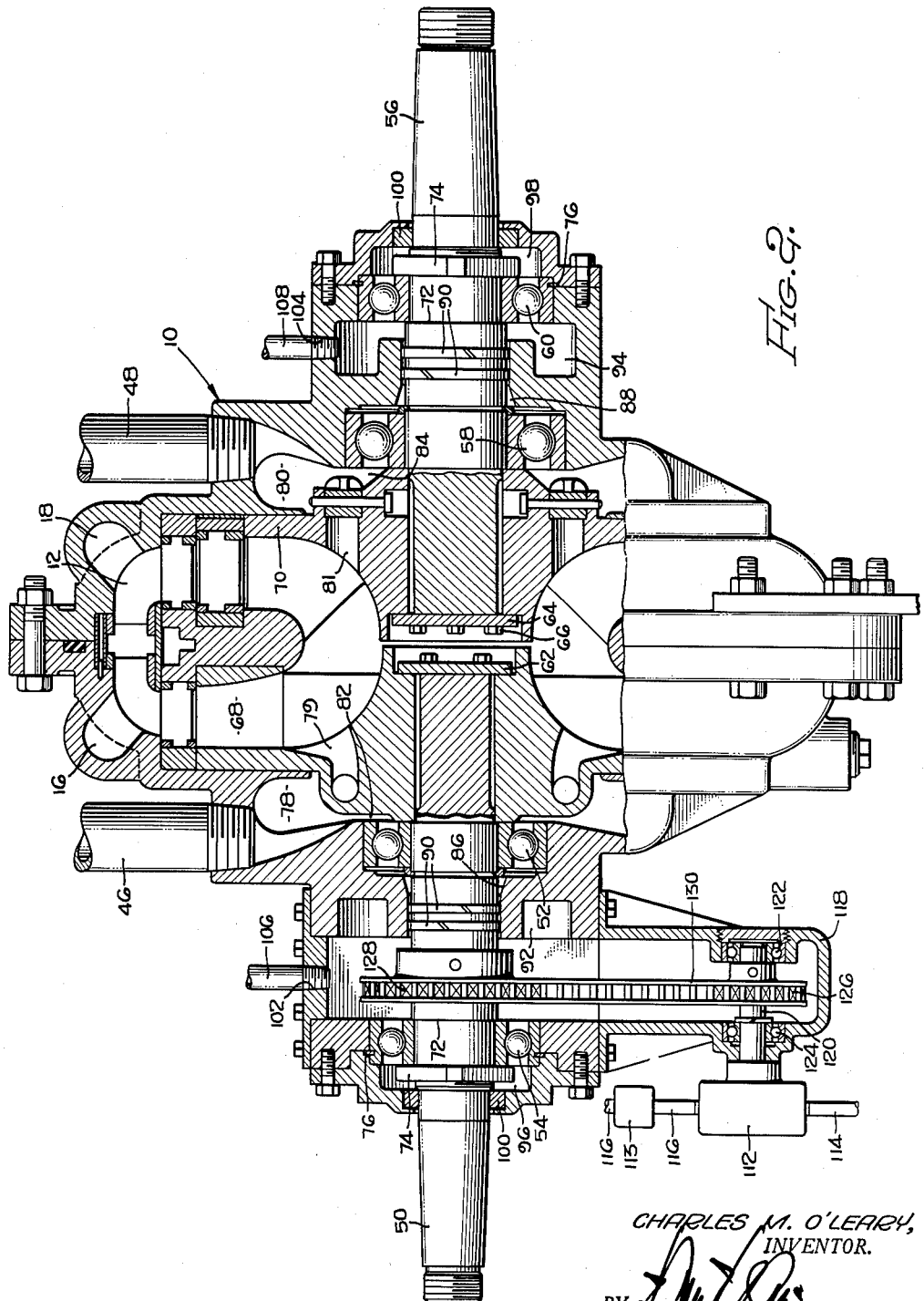
Figure 3:
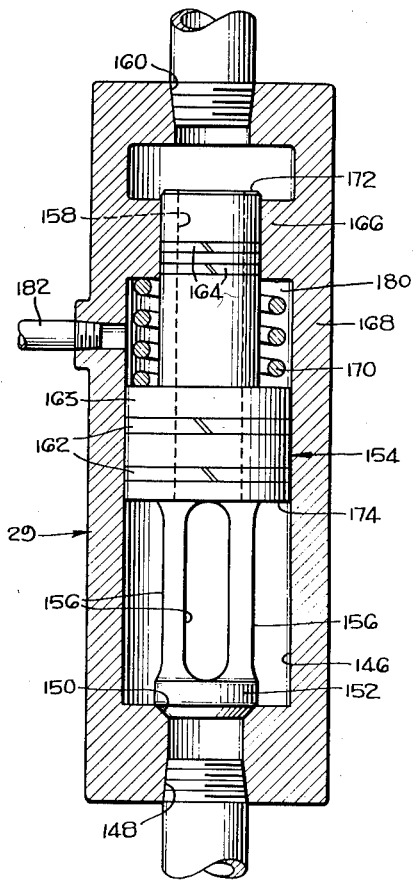
Figure 4:
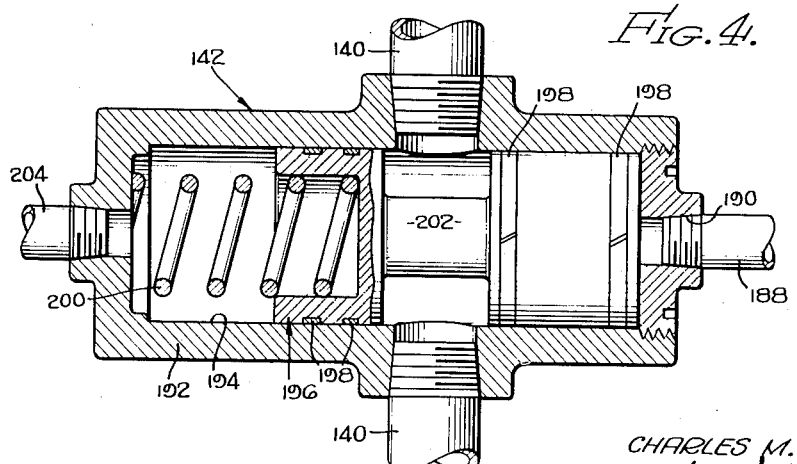

In the drawings, forming a part of the present specification,

Figure 1 is an end elevation, partly in section, of the preferred embodiment of my invention, Figure 2 is a partial section along the line 2—2 of Figure 1 showing my torque converter, Figure 3 is a sectional view of my poppet valve 29, and Figure 4 is a sectional view of my valve 142.

Referring to the drawings, as best shown in Figure 2, I provide a torque converter 10 which has the usual torus-shaped cavity 12 therein. Torus 12 is filled with operating liquid 14 which, in addition to being utilized within the torus to drive the turbine blades, also provides a liquid medium which conveys excessive heat from within the torus to a radiator and acts as a lubricant for the converter input and output shaft bearings.

In order to utilize the operating liquid for these two additional purposes I provide a liquid circulatory system which contains both cooling circuit elements and lubricating circuit elements which are external to torus 12 of the converter. All of these circuit elements are integrally connected in such a way that torus 12 will at all times be filled with substantially gas free operating liquid 14, even when the converter is shut down.

Referring now to my liquid circulatory system, as is best shown in Figure 2, and particularly to the cooling circuit elements therein, my converter 10 is provided with a primary liquid outlet 16 and a secondary liquid outlet 18, outlet 16 opening into torus 12 at a point where liquid is discharged from the pump element of the converter, and outlet 18 opening into torus 12 at a point where liquid is discharged from the turbine element of the converter. Connected to respective outlets 16 and 18 are liquid lines 20 and 22, best shown in Figure 1, which are joined together by means of a Y-joint 24 so that liquid from both of these lines will pass through line 26 into a liquid actuated fan drive motor 28. Motor 28 is shown and described in detail in my co-pending application, Serial Number 240,178, for Hydrokinetic Torque Transmitter and Cooling System Therefor, now Patent No. 2,714,804, issued August 9, 1955.

I provide a poppet valve 29 and a check valve 30 in line 20, and I also provide a poppet valve 31 and a check valve 32 in line 22. Check valves 30 and 32 prevent liquid from returning to the torus through ports 16 and 18 when poppet valves 29 and 31 are held open by the pressure in the system.

A cooling fan 34 is attached to one end of motor shaft 36 which rotates at a speed proportional to the rate of flow of liquid through motor 28.

After the liquid 14 has passed through motor 28, it is conducted through line 38 into radiator input header 40 from which it passes through radiator 42 into radiator output header 44. Fan 34 is positioned directly in front of radiator 42 so as to either draw or blow air through the radiator.

The liquid is then conducted back to torque converter 10 by means of return conduits 46 and 48, as is best shown in Figure 2, each of which is provided with a check valve 49 to prevent liquid from leaving the converter by way of these lines. The liquid re-enters the converter through lines 46 and 48 at its low-pressure intake side.

Referring now to the internal structure of torque converter 10 and to my associated lubricating circuit elements, which are best shown in Figure 2, converter 10 is provided with an input shaft 50, which is journaled in bearings 52 and 54, and an output shaft 56 which is journaled in bearings 58 and 60. Plates 62 and 64 are affixed to the inner ends of shafts 50 and 52, respectively, by means of bolts 66. Shafts 50 and 56 are splined to the converter pump and turbine elements 68 and 70, respectively. Lateral movement of shafts 50 and 56 is prevented by shoulders 72 on shafts 50 and 56, and by locking rings 74 which engage the respective bearings 54 and 60, these two bearings being locked against lateral motion by means of annular rings 76.

The operating liquid 14 which returns to torus 12 by way of return conduits 46 and 48 enters converter input chambers 78 and 80 on the pump and turbine sides of the converter, respectively. A portion of this liquid enters annular liquid passages 82 and 84, respectively, while the remainder enters the torus 12 by way of ports 79 and 81 to be utilized in the normal converter operation.

The lubrication portion of the liquid then passes from annular passages 82 and 84 into bearings 52 and 58, respectively, to lubricate them. The liquid which passes on through bearings 52 and 58 then flows along the converter input and output shafts 50 and 56 through tubular passages 86 and 88, respectively, and seeps by oil rings 90, entering input and output shaft accumulation chambers 92 and 94, respectively. Oil rings 90 may be piston rings or any other suitable rings to restrict the flow of liquid from the torus 12.

The liquid 14 is preferably a light lubricating oil. That portion of this oil which enters chambers 92 and 94 will lubricate bearings 54 and 60, the annular spaces 96 and 98 adjacent to these bearings providing room wherein any oil which passes through one part of the bearings may circulate so as to return to chambers 92 and 94 through another part of the bearings. Sealing rings 100, composed of any suitable packing material, prevent any of the oil from passing entirely out of the converter along the shafts.

Outlet ports 102 and 104 are provided above the level of oil rings 90 and preferably at the top of accumulation chambers 92 and 94, respectively. This forms a gas trap which will prevent air from backing up to torus 12 by seeping past oil rings 90. As is best shown in Figure 1 the lubricating oil passes out through ports 102 and 104 into conduits 106 and 108, respectively, which convey the oil to reservoir 110.

Reservoir 110 is maintained at atmospheric pressure by an opening 111 in the top thereof so that the lubricating oil will readily flow through conduits 106 and 108 into reservoir 110.

The rate of flow of lubricating oil through the bearings is controlled by the oil rings 90, and amounts to about one cup per minute for each side of the converter.

A pressure pump 112, best shown in Figure 2, withdraws oil from reservoir 110 through a tube 114, having a foot valve 115 therein, which opens near the bottom of the reservoir. This oil is then pumped by pressure pump 112 through pressure regulator 113 and line 116 into a high pressure region within the torus 12. Two purposes are accomplished by thus pumping oil from reservoir 110 into a high pressure region of torus 12. First, oil which has been utilized for lubrication purposes is returned to the converter and thus replaces the leakage of the system. Second, oil pressure within torus 12 is maintained above atmospheric pressure to suppress cavitation of the oil as it passes over the blades of the turbine.

Pressure pump 112 is integrally connected to a housing 118 that is bolted to the torque converter housing in such a manner that the interior of housing 118 communicates with input shaft accumulation chamber 92. Shaft 120 of pump 112 is journaled in bearings 122 and 124, and has attached thereto a sprocket 126. A second sprocket 128 is affixed to input shaft 50, and is operatively connected with sprocket 126 by means of a drive chain 130. By this construction pump 112 is driven by the rotation of input shaft 50, and pump 112 and pump shaft 120 are lubricated by the oil which is contained in input shaft accumulation chamber 92.

Referring to Figure 1, a bleeder line 132 is connected to the tops of radiator input and output headers 40 and 44 by means of small discharge tubes 134 and 136, respectively. The other end of bleeder line 132 opens into reservoir 110. This bleeder line 132 is adapted to convey any foam, oil, or air from the tops of radiator input and output headers 40 and 44 into reservoir 110 when the pressure within headers 40 and 44 is above atmospheric pressure during the normal operation of the converter. Thus, an additional source of oil supply is provided to keep the oil within reservoir 110 above the opening of tube 114. Any air in the oil which bleeds out through bleeder line 132 is permitted to settle out in reservoir 110, so that this oil is substantially air free and may be re-used in the converter.

A check valve 138, which may be spring loaded, is provided in bleeder line 132. Check valve 138 opens in the direction of reservoir 110 so that oil and air can pass from the tops of radiator headers 40 and 44 into reservoir 110, but neither oil nor air can pass in the other direction. Check valve 138 is essential in order to keep the oil level above the torus 12 of the converter after the converter has been shut down, as will be hereinafter described.

I provide a manually operable control valve 144 in bleeder line 132 to permit the amount of bleed-off through line 132 to be manually adjusted.

When the converter is in operation, and the pressure in the system is above atmospheric pressure, check valve 138 will open toward reservoir 110 to permit foam, air or oil to flow from radiator headers 40 and 44 to reservoir 110. This keeps up the level of the oil in reservoir 110, and also keeps up the level of the oil in radiator headers 40 and 44 so that when the converter is shut down there will be sufficient oil in headers 40 and 44 to permit the oil level to drop a small amount without having the level drop below the top of the torus. Normally the oil level will never drop below the radiator headers 40 and 44.

During the operation of my converter 10, torus 12 and its associated areas are filled with oil 14 which is maintained at a pressure preferably from 40 to 90 pounds per square inch. The areas in addition to torus 12 which are maintained above atmospheric pressure are defined by piston rings 90 on shafts 50 and 56, respectively; by control valve 144 in bleeder line 132; by the sealing means associated with any of the moving parts in the liquid circuit from primary liquid outlet 16 and secondary liquid outlet 18, through the cooling system, and back into the torus through low pressure ports 79 and 81; and by the sealing means associated with any of the moving parts in the oil circuit from pressure pump 112 into the torus through line 116, the latter circuit including the seals within pressure regulator 113 and valve 142.

All other areas and lines in the system are not sealed off from the atmosphere, so that the pressure within these other areas is substantially below the pressure within the above-described sealed area. Any fluid which escapes from the above sealed area into the above unsealed area will be conveyed toward oil reservoir 110.

I will now trace the operation of my torque converter liquid control system to illustrate the manner in which my control system maintains the liquid at its maximum density from the normal operating condition to the shutdown condition wherein the liquid contracts due to the difference between the mean operating temperature and the ambient temperature, and back to normal operation.

During normal operation of my converter 10, input shaft 50 and pump element 68 are driven by an engine (not shown). Oil 14 within torus 12 is circulated by the rotation of shaft 50 and pump element 68 so as to pass over the blading of turbine element 70 in the customary manner to transmit power from the converter pump member to the turbine member.

While the turbine element 70 is thus being rotated in the forward direction a small portion of the total amount of oil being circulated within torus 12 passes out of torus 12 by way of port 16, fluid line 20 and valve 29. As best shown in Figure 3 this oil passes into cylindrical chamber 146 of valve 29 through valve inlet port 148 and between valve seat 150 and the valve head 152 of otherwise tubular valve element 154. This oil then passes through lateral passages 156 in valve element 154 into tubular passage 158 disposed longitudinally through tubular valve element 154, and then out of valve 29 through valve outlet port 160. Valve 29 is, at this time, acting as a poppet valve.

Tubular valve element 154 is provided with piston rings 162 on outwardly flanged portion 163 of valve element 154 which cooperate with cylindrical chamber 146, and is also provided with piston rings 164, of considerably smaller diameter than rings 162, which cooperate with the cylindrical wall of an inwardly extending flange 166 in the valve housing 168.

A compression spring 170 disposed between flanges 163 and 166 normally urges valve element 154 into the closed position. However, when fluid fills the entire cooling system so that fluid pressure on both sides of valve 29 is substantially the same there will be a total force differential between the small upper area 172 and the larger lower area 174 of tubular valve element 154, and this force differential will be sufficient to overcome the compression of spring 170 in order to keep valve 29 in the open position.

After leaving valve 29 the oil 14 from torus 12 passes through check valve 30 which permits the oil to flow away from, but not towards, the torus 10. The oil then passes through Y-joint 24, line 26, motor 28 and line 38 to radiator header 40. Most of this oil passes from header 40 through radiator 42 into header 44.

Headers 40 and 44, including the respective domed portions 176 and 178 thereof which are disposed well above the oil lines to radiator 42, are completely filled with operating oil 14 under pressure. The domed portions 176 and 178 of headers 40 and 44, respectively, act as traps to collect air or aerated oil which may be in the oil flowing upward from torus 12. This air, aerated oil and a certain amount of the gas free operating oil are discharged from domes 176 and 178 through lines 134 and 136 and line 132 into reservoir 110. These fluids pass through check valve 138, which prevents backup into headers 40 and 44, and through manual control valve 144 which may be manually adjusted to determine the amount of fluid which passes out of headers 40 and 44 and into reservoir 110.

Any air which was in the fluid thus conveyed into reservoir 110 is permitted to settle out while the oil remains within reservoir 110, so that the oil 14 which is returned to torus 12 from reservoir 110 by pump 112 is substantially free of entrained air.

After the oil 14 has passed through radiator 42, wherein it is cooled by air which is blown through radiator 42 by means of fan 34 that is rotated by motor 28, and has passed into output header 44, the oil 14 is returned to torus 12 by means of return conduits 46 and 48. Conduits 46 and 48 conduct the oil to converter input chambers 78 and 80, from which the oil is conveyed through low pressure area ports 79 and 81 to torus 12 to replace the oil flowing out of torus 12 through primary outlet 16. Check valves 49 in return conduits 46 and 48 are closed by the pressure within the torus while pressure is being built up in the cooling system, and are opened when the pressure in the cooling system reaches its normal operating pressure.

The oil 14 which continuously leaks by piston rings 90 on converter input shaft 50 collects in input shaft accumulation chamber 92, and when accumulation chamber 92 is filled the excess oil drains out of accumulation chamber 92 through line 106 which conveys this oil to reservoir 110. Similarly, the oil 14 which leaks by piston rings 90 on converter output shaft 56 collects in output shaft accumulation chamber 94, and when chamber 94 is filled the excess oil drains out of chamber 94 through line 108 to reservoir 110.

Some of the oil which presses against small and large areas 172 and 174, respectively, of tubular valve element 154 in valve 29 to keep valve 29 open at all times during the operation of my converter will seep by piston rings 164 and 162, respectively. This oil enters chamber 180 between flanges 163 and 166 and is conveyed to reservoir 110 by line 182 which contains a check valve 184 that prevents oil from backing up into valve 29 from reservoir 110.

A certain amount of the oil which is pumped by pressure pump 112 from reservoir 110 through line 116 into a high pressure point within torus 12 will be diverted from line 116 by the pressure regulator 113 during the normal operation of regulator 113. This oil drains back to reservoir 110 through pressure release line 186 which is connected to line 182 which in turn communicates with reservoir 110.

Valve 31, which operates simultaneously with valve 29, is identical in construction to valve 29, and the oil which seeps by the rings in valve 31 is conveyed to reservoir 110 through fluid line 187, containing check valve 189, which connects with line 182.

I provide a line 140 which connects line 38 with the uppermost portion of torus 12. Line 140 is provided with a valve 142 which permits air or aerated oil to leave the top of torus 12 through line 140 when the converter is shut down, but which prevents any fluid from leaving torus 12 through line 140 when the converter is in normal operation.

Although valve 142 may be an ordinary check valve, I prefer to use a positive fluid pressure operable valve 142 which is moved to its closed position by the pressure of oil supplied from pump 112 the instant pump 112 is started, so that there will be no delay between the time the converter is started and the time of closing of valve 142.

Liquid pressure to actuate valve 142 is provided by tapping line 116 between pressure pump 112 and pressure regulator 113 with a branch line 188 which is connected to input port 190 of valve 142. To insure that branch line 188 receives oil at a higher pressure than the oil received at pressure regulator 113, I provide a restriction 191 in line 116 between pressure regulator 113 and the junction of lines 116 and 188.

As is best shown in Figure 4, valve 142 generally comprises a housing portion 192 containing a cylindrical chamber 194 in which is slidably mounted a valve element 196. Valve element 196 is provided with sealing rings 198, and is normally urged to the right in Figure 4 by means of a valve spring 200 disposed between the left end of cylindrical chamber 194 and valve element 196. In this position, valve element 196 is open, with the reduced diametral portion 202 of valve element 196 being disposed in connecting relation with line 140.

However, when oil pressure is applied to valve 142 through line 188, this pressure is applied to the right end of valve element 196 and causes valve element 196 to be moved to the left in Figure 4 against the force of spring 200 so as to block off line 140. Any oil which may seep by sealing rings 198 on valve element 196 will be carried off by relief line 204, having check valve 206 therein to prevent any fluid from backing up into valve 142. Relief line 204 is connected to line 182 so that fluid passing through line 204 will be conveyed to reservoir 110.

Pressure pump 112 is operating at all times during the normal converter operation, so that valve 142 will remain closed and gas free oil will be supplied to the torus through line 116 to maintain the oil within the torus at a pressure above atmospheric pressure and so as to make up for any losses of oil from the pressurized areas of my system.

During the above-described normal operation of my converter 10 and my associated liquid pressure control system the operating oil is maintained above ambient temperature at a temperature in the neighborhood of 240 degrees F.

When the engine (not shown) is stopped, shaft 50 and its connected parts, including pressure pump 112, also stop. At this time the leakage of oil past sealing rings 90 on shafts 50 and 56 and the flow of oil through line 132 and all of the other lines terminating in reservoir 110 permits the oil pressure within the system to return to atmospheric pressure.

Since heat was produced in the oil 14 during converter operation due to efficiency losses, when the converter is shut down, this source of heat is removed, so that the operating oil gradually cools off. This causes the oil to become substantially reduced in volume, and, in order to prevent the formation of air pockets in the system, this reduction in oil volume must be properly compensated for. My system is so constructed that in spite of this reduction in oil volume the torus 12 will at all times remain filled with substantially air free oil, even after the converter has been shut down.

When the engine (not shown) is stopped, valve 29 is closed by the compression of spring 170, this closing movement being permitted by the leakage of oil into chamber 180 past piston rings 162 and 164.

At the same time, valve 142 will be opened by the pressure of spring 200 upon valve element 196. This opening of valve 142 is permitted by the leakage of oil past sealing rings 198 into the portion of cylindrical chamber 194 which contains spring 200. This will provide a passage from the uppermost portion of torus 12 to header 40 through lines 140 and 38. Any air or aerated oil which is then positioned within the torus will at this time be completely removed from the torus by floating to the top of header 40, and air free oil from header 40 will take its place in torus 12.

The rate of replacement of air and aerated oil by air free oil in torus 12 through lines 140 and 38 depends upon the degree of aeration or emulsification of the oil 14 in the torus when the converter is shut down.

This structure which enables me to remove all air and aerated oil from the torus of my converter when the converter is shut down is an individual invention that is one of three separate and distinct inventions which are herein shown and described. I shall hereinafter refer to this invention as my hydrokinetic torque converter purging system.

Another individual invention, which will hereinafter be more particularly pointed out, concerns the structure which permits me to maintain the liquid level within my system at a point which is higher than the highest point within torus 12 when the converter is shut down and which permits liquid to be added within the system after the converter has been shut down to compensate for the shrinkage of the liquid within the system due to the drop in its temperature. I shall hereinafter refer to this second individual invention as my hydrokinetic torque converter liquid shrinkage compensating and liquid level maintaining system.

My third invention is a combination of the above two individual inventions which combines the advantages of these into one liquid pressure control system having a simple and sturdy construction and having a minimum number of parts.

Although my two individual inventions are closely structurally interrelated in the present drawings and description, each of these inventions may be satisfactorily used independent of the other.

I will now describe my torque converter liquid shrinkage compensating and level maintaining system. When the liquid begins to contract within torus 12, headers 40 and 44, radiator 42 and the associated piping, due to the liquid temperature drop when the converter is shut down, the upper level of liquid 14 begins to drop because of gravitation and check valve 138 in line 132 will immediately close. This creates a low pressure in headers 40 and 44 which prevents any further falling of the liquid level. As the liquid 14 in the torus continues to contract, atmospheric pressure on the oil in reservoir 110, which is applied through opening 111, forces oil from reservoir 110 into input and output accumulation chambers 92 and 94 through lines 106 and 108, respectively. Oil will be sucked from chambers 92 and 94 past sealing rings 90 into torus 12 to compensate for the shrinkage of the oil within the system.

Sufficient oil is retained within chambers 92 and 94 at all times to compensate for the maximum anticipated oil shrinkage in the system.

Any air which might find its way into lines 106 or 108, or in accumulation chambers 92 or 94, will remain trapped within lines 106 or 108, or within chambers 92 or 94, and will not gain access to the torus 12, because of the fact that the fluid level in lines 106 and 108 and chambers 92 and 94 is sufficiently higher than the fluid passages from chambers 92 and 94, past rings 90 into torus 12 to assure that only gas free oil will be sucked past said rings and into said torus.

When a balance is reached between the atmospheric pressure which supports the liquid in the system at points within reservoir 110 on the one hand, and the weight of the liquid within the system and the low pressure areas at the tops of headers 40 and 44 on the other hand, and when the liquid shrinkage has ceased, there will be no further flow of liquid in the system. Thus, the whole system will be sealed against the entry of air or the loss of liquid until the engine (not shown) is again started.

When this happens, the shaft 50 is rotated and pressure pump 112 is actuated through sprockets 126 and 128 and drive chain 130. Oil delivered from pump 112 through pipe 188 moves valve element 196 to the left in Figure 4 to positively close valve 142 in the manner hereinabove described. Only a small amount of oil pressure and oil volume are required from pump 112 in order to close valve 142, so that valve 142 will be closed after approximately 2 revolutions of input shaft 50.

At this time valves 29 and 31 are still closed, and check valves 49 in return conduits 46 and 48 are closed, so that all exits from torus 12 are closed. This permits pressure pump 112 to cause the pressure within torus 12 to build up by pumping oil into torus 12 through oil line 116.

Spring 170 in valve 29 is of such strength that a pressure within torus 12 which is slightly less than the normal operating pressure will be sufficient to move valve element 152 away from valve seat 150. When the pressure within torus 12 becomes sufficient to thus move valve element 152, additional oil pumped by pump 112 will flow through valve 29 and fill the entire system above valve seat 150, while the pressure within torus 12 will remain slightly below the normal operating pressure.

As soon as the system becomes filled with oil in the above manner, the function of valve 29 ceases to be that of a poppet valve. Thus, after the whole system is full of oil and the oil pressure has equalized itself on both sides of tubular valve element 154, the total force differential due to the difference in area between relatively large lower area 174 and small upper area 172 on tubular valve element 154 will keep valve element 154 in its upper position so that valve 29 will remain open.

The oil may now circulate freely from the high pressure area of the torus to the radiator and back to the low pressure areas in the torus.

Although I have described the operation of my torque converter fluid control system during the normal drive operation of my converter, my system will function in substantially the same manner if my converter is being used as a brake. The only difference between my braking and driving operations is that in the former, oil is pumped by both the pump and turbine elements 68 and 70, respectively, out of the primary and secondary outlets 16 and 18, respectively, whereas in the latter operation, the oil is only pumped out of primary fluid outlet 16, in the manner hereinabove described.

Although my present inventions are illustrated in connection with a torque converter having both primary and secondary fluid outlets, it is to be understood that my inventions operate equally as well where a torque converter having a single fluid outlet is used.

It is to be understood that both of my interrelated individual inventions which I have hereinabove described may be used either in conjunction with each other as my combination invention in the manner which I have described, or they may be used separately and completely independently of each other as my individual inventions.

It is to be understood that the forms of my inventions herein shown and described are my preferred embodiments and that various changes in the shape, size and arrangement of parts may be resorted to without departing from the spirit of my inventions or the scope of the appended claims.

I claim:

1. A system for purging a hydrokinetic torque converter torus of air comprising a liquid containing header positioned above the converter torus, means forming an air-trap-free passage connecting the lower portion of said header with the substantially uppermost portion of said torus, means for exhausting air from said header, and means for supplying liquid to said torus.

2. A system for purging a hydrokinetic torque converter torus of air comprising a liquid containing header positioned above the converter torus, means forming an air-trap-free passage connecting the lower portion of said header with the substantially uppermost portion of said torus, means for supplying liquid to said torus, means for exhausting air from said header, and means for preventing re-entry of air to said header through said air exhausting means.

3. A system for purging a hydrokinetic torque converter torus of air comprising a liquid containing header positioned above the converter torus, means forming an air-trap-free passage connecting the lower portion of said header with the substantially uppermost portion of said torus, means for supplying liquid to said torus, and a check valve opening outward from the upper portion of said header.

4. A system for purging a hydrokinetic torque converter torus of air comprising a liquid containing header positioned above the converter torus, means forming an air-trap-free passage connecting the lower portion of said header with the substantially uppermost portion of said torus, means for exhausting air from said header, means for supplying liquid under superatmospheric pressure to said torus, a valve in said passage and means for actuating said valve to close said passage when said converter starts and to open said passage when said converter stops.

5. A system for purging a hydrokinetic torque converter torus of air comprising a liquid containing header positioned above the converter torus, means forming an air-trap-free passage connecting said header with the substantially uppermost portion of said torus, means for supplying liquid under pressure to said torus, a valve in said passage, means for actuating said valve to close said passage when said converter starts and to open said passage when said converter stops, and a check valve opening outward from the upper portion of said header.

6. A torus-type hydrokinetic torque converter liquid control system which comprises a source of liquid, a liquid connection between said source of liquid and the torus of said converter, a liquid pressure pump in said liquid connection, a liquid containing header positioned above the converter torus, a liquid line connecting the primary fluid of the converter torus with said header, a liquid return conduit from said header to a relatively low pressure portion of said converter torus and a poppet valve in said liquid line and responsive to a reduction of the pressure in said line below the normal operating pressure within said line to close off said line until the operation of said converter and said pressure pump raises the pressure of liquid within the torus to substantially operating pressure whereupon said valve responds to said pressure and opens said line permitting the passage of liquid from said torus to said header.

7. A torus-type hydrokinetic torque converter liquid control system which comprises a source of liquid, a liquid connection between said source of liquid and the torus of said converter, a liquid pressure pump in said liquid connection, a liquid containing header positioned above the converter torus, means forming an air-trap-free passage connecting said header with the substantially uppermost portion of said torus, a valve in said passage, means for actuating said valve to close said passage when said converter starts and to open said passage when said converter stops, a conduit from the high pressure side of said converter to said header, a return conduit from said header to the low pressure side of said converter, and a poppet valve in said first named conduit, said poppet valve being spring biased to close off said first named conduit until said pressure raises the pressure of liquid within the torus to substantially operating pressure whereupon said poppet valve yields to said pressure permitting the passage of liquid from said torus through said first named conduit to said header.

8. A system for maintaining a hydrokinetic converter torus filled with substantially gas free liquid both while in operation and while shut down which comprises a fluid containing header positioned above the converter torus, means forming an air-trap-free passage connecting said header with the substantially uppermost portion of said torus, valve means responsive to the starting of said converter to shut said passage so as to prevent the flow of liquid from said torus through said passage during said operation, said valve being responsive to the stopping of said converter to open said passage and permit gas accumulating in the uppermost portion of said torus to flow upwardly through said passage into said header and a counterflow of liquid from said header downwardly through said passage to take the place of the gas thus discharged from said torus, means providing a reservoir of liquid open to the atmosphere, a pipe bleeding air from an upper portion of said header into said reservoir, whereby liquid passing therethrough will enter said reservoir, and a pump driven in common with said converter and withdrawing liquid from said reservoir and forcing said liquid into said torus at a superatmospheric pressure.

9. A combination, as in claim 8, in which a primary conduit is provided leading from a relatively high pressure area in said torus and connecting with said header to deliver a constant flow of liquid from said torus to said header while said converter is operating, a secondary conduit leading from said header and connecting with said torus to return liquid from said header to a low-pressure area in said torus, and a check valve in said air bleeder pipe preventing the flow of fluid therefrom to said header but allowing the flow of fluid from said header to said reservoir.

10. A combination, as in claim 9, in which a pressure responsive valve is provided in said primary conduit which is responsive to pressure in said conduit so as to allow the flow of fluid therealong only after a certain minimum pressure has been developed in the liquid in said torus upon starting said converter.

11. A combination, as in claim 10, in which a check valve opening towards said torus is provided in said secondary conduit.

12. A combination, as in claim 11, in which said converter includes a housing, and pump and turbine elements, said elements being mounted respectively on coaxial shafts which journal in bearings in said converter housing, means forming seals about said shaft permitting a leakage of liquid axially along said shaft past said seals, means forming low pressure liquid collection chambers, disposed outwardly from and extending substantial distances above said seals, and pipes connecting with the uppermost portions of said chambers and leading to said reservoir so that liquid seeping past said leaking seals into said chambers accumulates in and fills said chambers to a level submerging said seals whereby said liquid flows from said chambers through said pipes and into said reservoir.

13. A system for maintaining a hydrokinetic converter torus filled with substantially gas free liquid both while in operation and while shut down which comprises a reservoir for liquid, a pump driven in common with said converter and withdrawing liquid from said reservoir and delivering said liquid into said torus, said converter including a housing and pump and turbine elements, said elements being mounted respectively on coxial shafts which journal in bearings provided in said converter housing, high pressure seals about said shafts permitting an axial escape of liquid from said torus past said seals, means forming liquid collection chambers about said shafts and extending a substantial distance thereabove to collect the liquid escaping past said seals, fluid tight seals preventing the escape of liquid along said shafts where the same extend outwardly from said collection chambers and conduits leading from upper portions of said collection chambers to said reservoir, said conduits delivering liquid from said chambers to said reservoir after said leakage has substantially filled said chambers.

14. In a hydrokinetic torque converter, the combination of: a housing forming a converter chamber, bearings in said housing, coaxial shafts journalling respectively in said bearings, pump and turbine members mounted upon said shafts for rotation in said chamber, means for pumping liquid under superatmospheric pressure into said chamber, pressure seals about said shafts which seal confined liquid in said chamber at the desired pressure but permit an axial escape of liquid from said chamber past said seals, means providing collection chambers surrounding said shafts outside said seals to collect liquid and constantly submerge said seals in liquid whereby, when said converter is shut down, a sufficient supply of liquid will be present in said collection chambers so that only gas-free liquid will be sucked into the converter chamber through said seals by the cooling and consequent contraction of the liquid in said converter chamber.

15. In a hydrokinetic torque converter, the combination of: a housing forming a converter chamber, bearings in said housing, coaxial shafts journalling respectively in said bearings, pump and turbine members mounted upon said shafts for rotation in said chamber, means for pumping liquid under superatmospheric pressure into said chamber to fill the same with liquid, a heat exchanger, a primary conduit leading from a relatively high pressure area in said converter chamber to said heat exchanger, a secondary conduit returning liquid from said heat exchanger to a relatively low pressure area in said chamber, a check valve in said return conduit preventing a reverse flow of liquid therein, and a spring biased pressure valve in said primary conduit set to close said conduit to a flow of liquid therealong from said chamber to said heat exchanger until a predetermined pressure has been developed in the liquid in said chamber, whereupon said valve opens and permits a flow of liquid to circulate from said chamber and through said heat exchanger and back to said chamber.

16. A combination as in claim 15 in which said valve includes an unbalanced fluid pressure responsive means which responds to liquid after the same has passed from said chamber through said valve and into said primary conduit, when the pressure in the latter exceeds a given value, to hold said valve open to permit free circulation of liquid from said chamber through said heat exchanger.

17. In a hydrokinetic torque converter, the combination of: a housing forming a converter chamber, pump and turbine members rotatably mounted in said housing in said chamber whereby said pump member may be driven by an engine, a stationary blade member mounted within said housing adjacent said pump and turbine members, said chamber being filled with a liquid which is circulated in said chamber by said pump member when the latter is rotated, a pump for supplying liquid under pressure to said chamber, a liquid discharge line leading from said chamber, a liquid return line leading to said chamber, a heat exchanger to which said discharge line and return line connect to form a substantially closed liquid system external to said chamber, a check valve in said return line preventing an outward flow of liquid from said chamber through said line, a spring biased valve in said discharge line preventing the outward flow therethrough until the liquid pressure in said chamber reaches a predetermined value, and pressure responsive means in said external system for opening said spring biased valve more widely when the liquid pressure in said system exceeds a given value whereupon a free circulation of liquid may take place from said chamber through said system and back to said chamber.

18. A combination as in claim 17, in which a pressure regulator is provided controlling the pressure of oil delivered to said chamber to cause said pump to build up and maintain a pressure therein in excess of said given value.

19. In a hydrokinetic torque converter, the combination of: a housing forming a converter chamber, a bearing in said housing, a shaft journaling in said bearing and rotating in said bearing during the operation of said converter, means for pumping liquid under superatmospheric pressure into said chamber, a pressure seal about said shaft which seal confines said liquid in said chamber at the desired pressure but permits an axial escape of liquid from said chamber past said seal, means providing a collection chamber surrounding said shaft outside said seal to collect liquid escaping from said chamber past said seal to form a pool of said liquid constantly submerging said seal in said liquid whereby, when said converter is shut down, a sufficient supply of liquid will be present in said collection chamber above the level of said seal so that only gas free liquid will be sucked into the converter chamber through said seal by the cooling and consequent contraction of the liquid in said converter chamber.

20. A combination as in claim 19 in which a heat exchanger is provided above said converter, a liquid discharge line connecting said heat exchanger with a high pressure portion of said chamber, a liquid return line connecting said heat exchanger with a low pressure portion of said chamber thereby forming a closed circuit of liquid from said chamber through said discharge line to said heat exchanger and returning from the latter through said liquid return line to said chamber, and a constricted bleeder line from an elevated point in said closed circuit, said bleeder line having a check valve preventing a reverse flow therein.

References Cited in the file of this patent

UNITED STATES PATENTS

| | | |
|---|---|---|
| 1,910,697 | Kiep | May 23, 1933 |
| 1,934,936 | Lysholm | Nov. 14, 1933 |
| 1,975,505 | Föttinger | Oct. 2, 1934 |
| 2,049,673 | Starr | Aug. 4, 1936 |
| 2,388,112 | Black et al. | Oct. 30, 1945 |
| 2,453,877 | Trail | Nov. 16, 1948 |
| 2,558,976 | O'Leary | July 3, 1951 |
| 2,643,517 | Michell | June 30, 1953 |